F. H. WILBY.
Forms for Forming Watch-Case Backs.

No. 159,993 Patented Feb. 16, 1875.

Witnesses
Thomas J. Beurey.
Isaac Rindge

Inventor
Fritz H. Wilby,
By His Attorney
Stephen Ustick

THE GRAPHIC CO. PHOTO-LITH. 39 & 41 PARK PLACE, N.Y.

UNITED STATES PATENT OFFICE.

FRITZ H. WILBY, OF PHILADELPHIA, PENNSYLVANIA.

IMPROVEMENT IN FORMS FOR FORMING WATCH-CASE BACKS.

Specification forming part of Letters Patent No. 159,993, dated February 16, 1875; application filed January 9, 1875.

CASE B.

*To all whom it may concern:*

Be it known that I, FRITZ H. WILBY, of the city and county of Philadelphia, in the State of Pennsylvania, have invented an Improvement in Watch-Case Combination-Chucks, of which the following is a specification:

My invention consists of a chuck for making watch-cases, the chuck having the shape of a finished back, in combination with a clamping-ring for confining a back thereon, the ring being connected with the chuck by means of a screw-thread, as hereinafter described.

Figure 1:
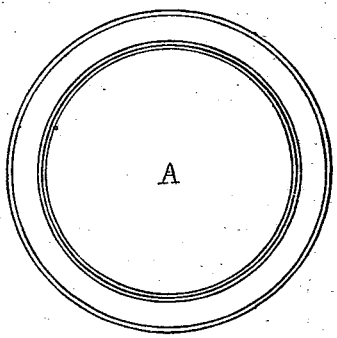
Figure 2:
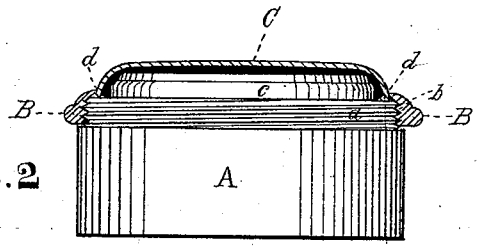
Figure 3:
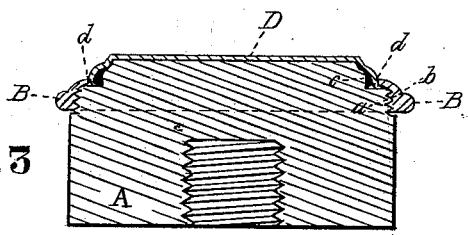

In the accompanying drawings, Figure 1 is a face view of the chuck A for shaping watch-case backs. Fig. 2 is an edge view of the same, having a back, C, and clamping-ring B in connection, in cross-section. Fig. 3 is a cross-section through the chuck A, clamping-ring B, and finished back C.

Like letters of reference in all the figures indicate the same parts.

A is the chuck upon which the back C is placed, and held down by means of the clamping-ring B, connected therewith by means of the screw-threads $a\ b$. The chuck outside of the screw-thread $a$, except the narrow surface $c$, against which the lip $d$ of the ring rests, is of the shape and dimensions assumed by the finished back. The clamping-ring B is screwed down to its place, as shown in Fig. 2. Then a burnisher is used for pressing down the back C until it fits the chuck, as shown in Fig. 3, to form the flat back D. For making swelled instead of flat backs, the chuck is made of the corresponding form the finished back has to assume.

I claim as my invention—

The chuck A, in combination with the clamping-ring B, for making the finished back, substantially as described.

FRITZ H. WILBY.

Witnesses:
    THOMAS J. BEWLEY,
    STEPHEN USTICK.